L. E. Hopkins,
Felting Machine.
No. 9450.  Patented Dec. 7, 1852.
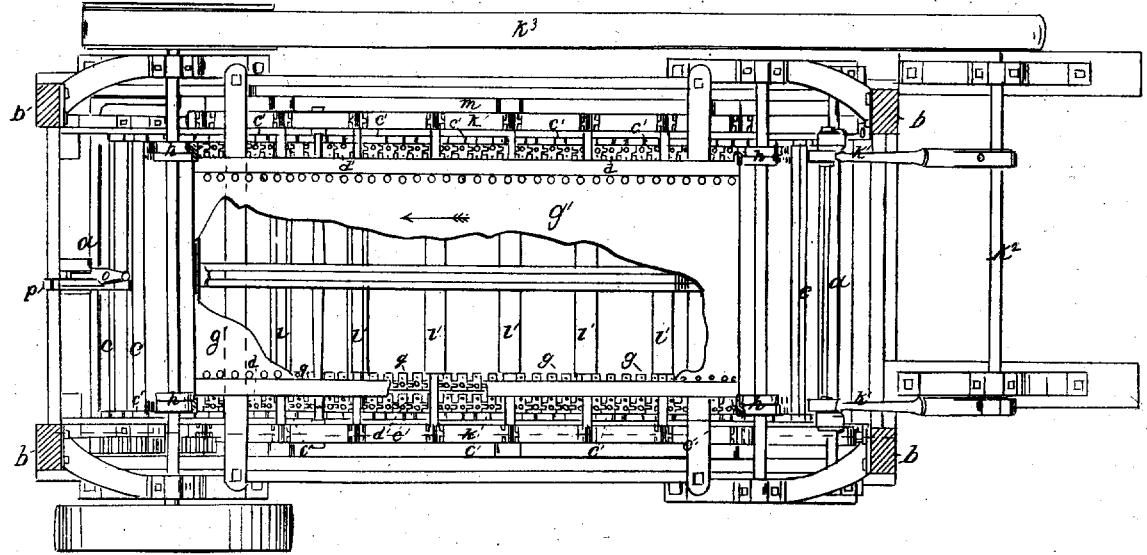
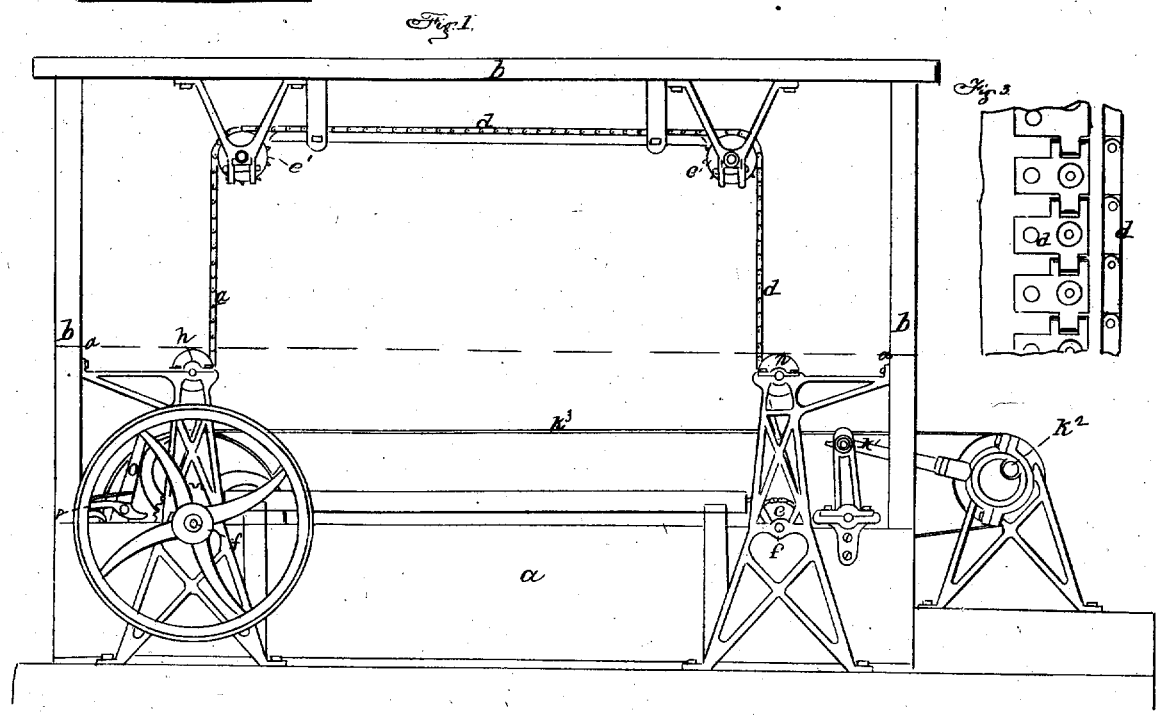

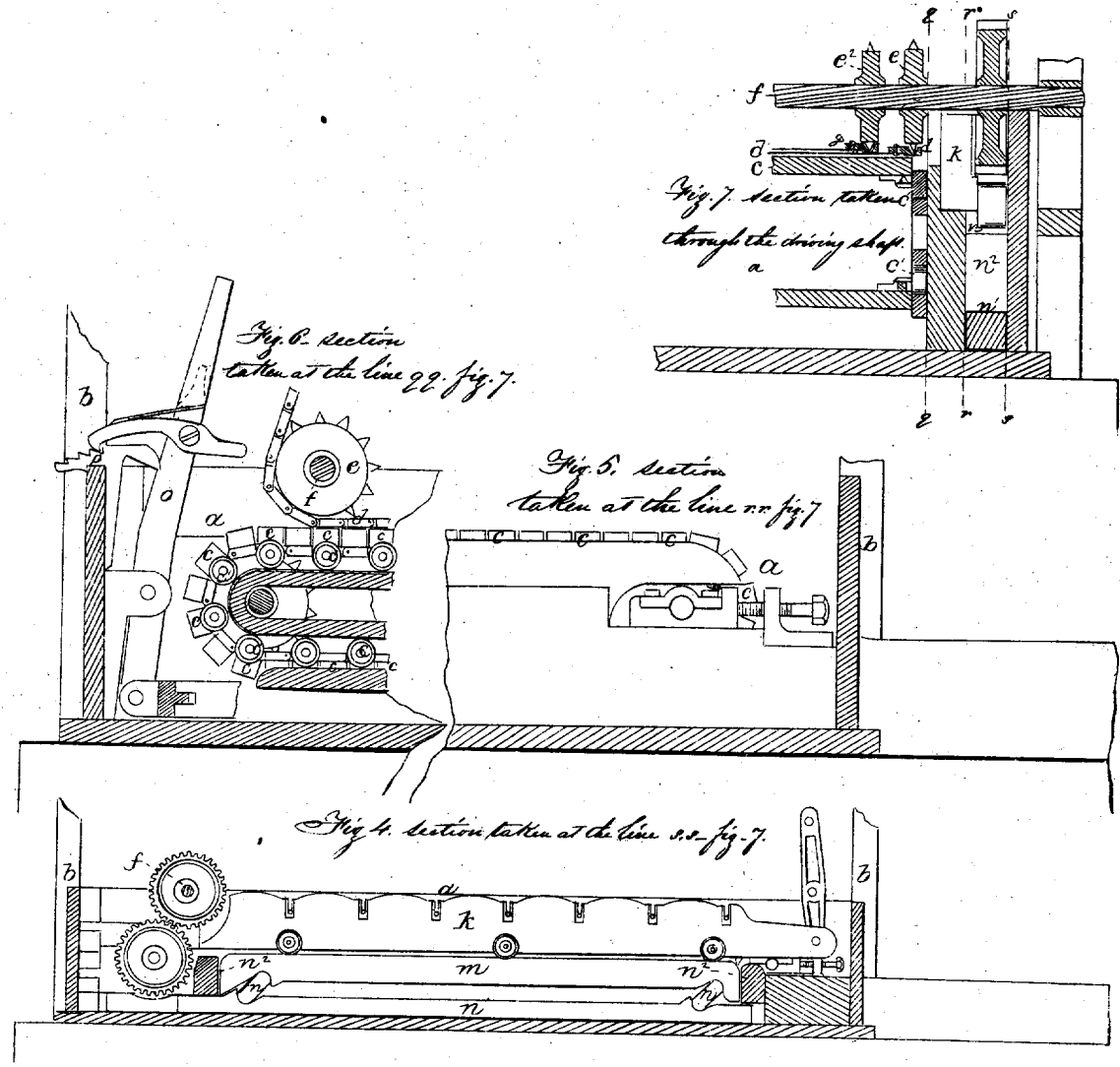

UNITED STATES PATENT OFFICE.

LANSING E. HOPKINS, OF NEW YORK, N. Y.

MACHINE FOR MANUFACTURING HAT-BODIES.

Specification forming part of Letters Patent No. 9,450, dated December 7, 1852; Reissued June 30, 1857, No. 476.

*To all whom it may concern:*

Be it known that I, LANSING E. HOPKINS, of New York, in the county of New York and State of New York, have invented certain new and useful Improvements in Machinery for Manufacturing Hats, and that the folllowing is a full, clear, and exact description of the principle or character which distinguishes them from all other things before known and of the usual manner of making, modifying, and using the same.

My improved apparatus for planking hats consists of an endless revolving planking table, and a series of planking rollers of peculiar form and movement, between which and the planking table two endless bands pass, so arranged and constructed, as to both move at exactly the same speed, the hat bodies being placed between them, by which the hats go through a similar process to hand manipulation without being improperly stretched out of place, or distorted in shape during the operation.

The construction is as follows: The battery ($a$) has projecting up from it a frame ($b$), the whole being made sufficiently stout to support the cylinders and moving parts hereafter described. Within the battery, and entirely below the top of the trough, there is an endless planking table, formed of two endless chains of metal, one on each side, with slots ($c$) extending from one to the other, and forming, when stretched in a straight line, a solid table, as their edges join; they pass around carrying rollers at either end, and are supported on a railway at the sides, on which small rollers ($c'$) attached to the slats, run, similar to a revolving platform horse power, above this endless planking table ($c$) there is an endless apron, which rests upon it, and moves with the same velocity; this is composed of two metal chains ($d$), one on either side, like those of the platform, to which is affixed a cloth ($d'$), that is stretched between them; the chain has guides to keep it exactly straight the whole length of the platform, and passes around a pulley ($e$) at either end, and thence up around rollers ($e'$) at the top of the frame, leaving space sufficient to work below the upper part of the endless band, as clearly shown in Fig. 1; upon the periphery of the pulleys ($e$) there are projecting pins that enter recesses in the chain, by which it is driven as the pulleys revolve.

The pulleys are on the shaft ($f$), and upon the same shaft are two other pulleys ($e^2$), that carry other chains ($g$), bearing another endless cloth apron directly above the first named one, that pass directly around the pulleys ($e^2$), exposing a flat surface at ($g'$), on which the hats are laid to be worked. Two rollers ($h$), one at either end, cause the outer apron ($d'$) to incline inward, to give a more perfect direction to the stock. The apron drivers and the endless planking table are geared together, so as to insure their moving with exactly the same velocity which is absolutely necessary to prevent the stock from getting out of place and becoming distorted during the process of felting as would be the case if one part was stationary or moved faster than the other as that would cause the position of the relative parts to be changed. There is a series of rollers ($i, i'$) extending across from side to side, between the upper and lower portions of the endless belt ($g$); these rollers can be made to bear with any desired pressure upon the planking table, they are hung in a carriage ($k$) which has a reciprocating motion in ways on either side of the battery; it is moved by pitmen ($k'$), which connect it with eccentrics on a revolving shaft, at ($k^2$), driven by a band ($k^3$) connected with the prime mover. The rollers are of two kinds, a portion of them being polygonal, as at ($i$). These, as they roll back and forth over the stock, serve to beat it up and make it work lively; the others are round, and as the stock passes along under them, they move back and forth with a short rapid motion, and thus produce the desired action upon the stock; to cause the proper pressure of the rollers. The ways ($m$), upon which the carriage ($k$) slides, are made to rise by being attached to two or more short arms ($n$), which are jointed to a movable piece ($n'$), below the arms ($n$) being inclined, and the under pin ($n'$) having an endwise motion; as it is made to move either one way or the other, the way rises or falls like a parallel ruler, it being guided in its up or down motion, by stops ($n^2$) on the battery. To move the lower pieces ($n'$) they are connected with the lever ($o$) that extends up above the battery at one end, and from it projects a hook, that catches into a rack ($p$) to hold it in any desired position.

When a machine thus constructed is put in motion, the stock is laid upon the belt ($g'$), and passes on the direction of the arrow down between the two bolts, and on to the planking table, still between the belts, when the whole passes forward at precisely the same velocity under the rollers ($i$), and thus moving forward and back, being at first lightly, and then harder, they work the stock till it is perfectly felted; every time the stock comes around it is handled by the workman and examined, and can thus be finished in the most perfect and rapid manner. After the stock is finished it is taken off, and a new supply put in. This machine is intended to be worked in conjunction with the hat forming machine.

Having thus fully described my improved method of planking hat bodies, what I claim therein as new, and for which I desire to secure Letters Patent, is—

1. The feeding belts, constructed substantially as described, with jointed chains, having cloth stretched between them, as set forth, by which their motion is exactly determined and equal.

2. I also claim the combination of the revolving endless planking board or table, with the feeding belts both moving with the same velocity for the purpose as described.

LANSING E. HOPKINS.

Witnesses:
WM. GREENOUGH,
TOLMIE CAMPBELL.

---

*Disclaimer.*

To the Commissioner of Patents:

The petition of Henry A. Burr, of the city, county, and State of New York, respectfully represents that Letters Patent of the United States were granted to LANSING E. HOPKINS for Improvements in Machinery for Manufacturing Hat-Bodies, bearing date the 21st day of December, 1852, which said Letters Patent are, by mesne assignments, vested in your petitioner; that he has reason to believe that through inadvertence and mistake the claim made in the specification of the said Letters Patent in the following words, viz., " I also claim covering the perforated cone, preparatory to a deposition of the fur thereon with a covering of thin cloth easily pervious to air upon which the fur is to be deposited, said cloth or fabric to be removed at each operation with the hat body deposited thereon," is too broad, covering that of which the said LANSING E. HOPKINS is not the original and first inventor.

Your petitioner prays that he may be permitted to disclaim, and he hereby does disclaim, so much of the claims in the specification of the said patent as is above quoted, the said disclaimer to operate to the whole extent of your petitioner's interest in the said patent, he having paid ten dollars into the Treasury of the United States agreeably to the requirements of the act of Congress in that case made and provided.

H. A. BURR.

[FIRST PRINTED 1912.]